Feb. 14, 1961
R. J. PHAIR
2,971,876
ADHESIVE COMPOSITION
Filed Dec. 4, 1956
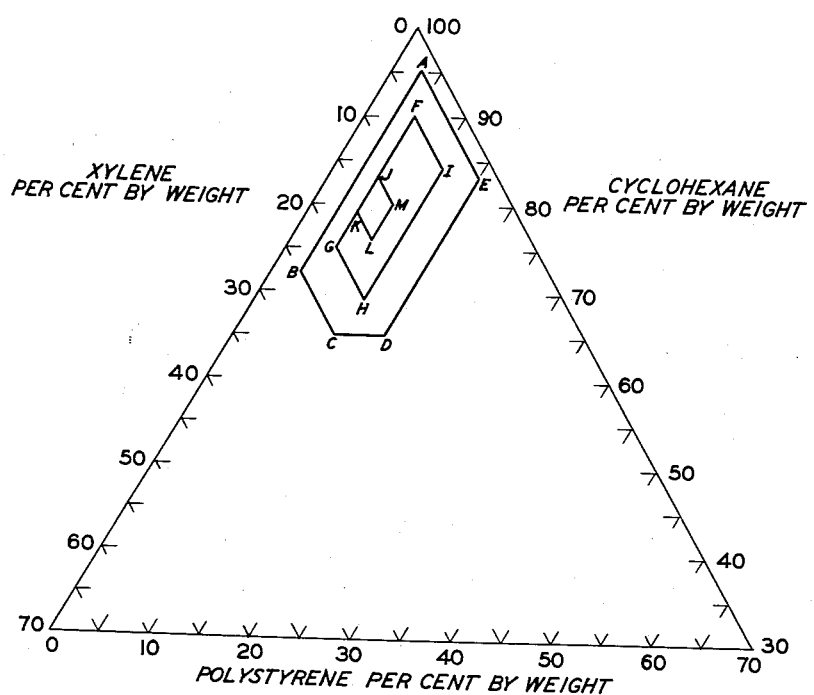
INVENTOR
R. J. PHAIR
BY
Edwin B. Cave
ATTORNEY

United States Patent Office 2,971,876
Patented Feb. 14, 1961

2,971,876

ADHESIVE COMPOSITION

Robert J. Phair, Hoboken, N.J., assignor to Bell Telephone Laboratories, Incorporated, New York, N.Y., a corporation of New York Filed Dec. 4, 1956, Ser. No. 626,269

9 Claims. (Cl. 154—139)

This invention relates to an adhesive composition for plastic articles, and particularly relates to an adhesive composition for cementing articles made from polystyrene.

Polystyrene is soluble in many polar and non-polar solvents. This solubility renders articles made of polystyrene particularly susceptible to attack by solvents. In the prior art, the use of adhesives or cements for joining two or more articles made from polystyrene has been of limited success because of attack of the polystyrene substrate by solvents contained within the cement. For articles of substantial body or thickness, such attack by the adhesive often may be ignored. Though unaesthetic results, such as "blushing," or "crazing," or the development of "orange-peel" surfaces may be obtained, still a bond of good strength may often be made.

For other applications, however, prior art adhesive materials are of limited utility. For example, when such materials are used in attempts to join thin polystyrene sheets, the attack by solvents in the cement on the polystyrene sheet usually causes etching through the sheet, spoiling the plastic.

The detrimental effects of solvents contained in prior art cements on thin polystyrene sheets are often magnified by the existence of the polystyrene sheets in a state of stress. To improve the physical properties of polystyrene, films or sheets of the material are often produced in which orientation of the styrene polymer chains has been accomplished by application of tension to the films while slightly thermoplastic. The resulting material, after cooling, is in a non-equilibrium state, and will tend to revert to a non-stressed condition. Often, the application of solvent material contained in a cement to such an oriented polystyrene sheet causes shriveling, warping, or contraction of the sheet by facilitating the return of the oriented, stressed material to an unstressed shape.

In finding a suitable cement for polystyrene, still another factor is to be considered. Polystyrene finds many uses as a dielectric material because of its extremely low loss factor, which has a value of about 0.0003 in the range of microwave frequencies. Other common plastic substances show loss factors in the order of 0.01 or greater in the same frequency range. A cement for joining polystyrene parts used in an assembly which relies on the good dielectric properties of polystyrene should also, preferably, have equally good dielectric properties. Degradation of the properties of the assembly below the dielectric properties of its component parts is otherwise difficult to avoid.

The novel cement described herein thus has as an object the joining of polystyrene articles without attack, by solvent action of the cement, of the polystyrene parts joined.

A further object of the cement is the joining of thin sheets of polystyrene without destructive etching of the sheets by the cement, even when the susceptibility of such sheets to solvent attack is increased by a stressed condition of the sheets due to orientation of the polymer molecules therein.

Still another object of the cement is the joining of polystyrene articles with a cement having dielectric properties comparable with those of the polystyrene parts joined.

The applicant has discovered that these objects can be accomplished by the use of a cement comprising polystyrene, a true solvent for polystyrene, a diluent which is compatible with the polystyrene and the true solvent, but which diluent alone has little or no affinity as a solvent for polystyrene, and, preferably, a plasticizer in addition.

Because of the high solubility of polystyrene in many common organic solvents, solutions of the plastic in a true solvent can easily be made to almost any desired consistency. However, such solutions, no matter how low the ratio of solvent to polystyrene dissolved therein, usually still attack the surfaces of parts sought to be joined when the solutions are used as cements.

In the compositions now set forth by the applicant the solvent activity of the cement is reduced by addition of a diluent to the polystyrene-solvent composition. The diluent is preferably a material in which polystyrene is insoluble or only slightly soluble, forming solutions weaker than 3 percent or 4 percent, for example. In the composition, the diluent, while reducing the etching strength of the true solvent, contributes little or no solvent activity of its own.

The diluent, also, is a material preferably more volatile than the true solvent, evaporating first from the cement as it dries. If the diluent is less volatile than the true solvent, escape of the solvent will tend to cause precipitation of the dissolved polystyrene in the remaining less-volatile diluent in which the polymer is insoluble. Weaker bonds are apt to be produced by such action than when the diluent first escapes, leaving a true solution of polystyrene as the bond-forming agent.

Further, the diluent is preferably a material completely compatible with the polystyrene solution, forming a homogeneous single phase therewith. In some cases, emulsions comprising the solvent and dissolved polystyrene as the dispersed phase and the diluent as the dispersant have proved of acceptable utility, however, and complete compatibility over all ranges of concentration is not a necessary requirement.

Because of the brittleness of polystyrene, it may be desirable to include a plasticizer in the polystyrene-base cements here taught. The addition of a plasticizing agent to the solvent-diluent-plastic composition will lend flexibility to the polystyrene residues left on escape of the solvent and diluent by evaporation. Such addition is not essential to other properties of the cement, and is not required where pliability of the cement films is non-essential.

As solvents for polystyrene, ketones, esters, and volatile aromatic compounds, particularly aromatic hydrocarbons, are noteworthy examples, though not the only possible materials. As mentioned, polystyrene is highly soluble in most common organic solvents. As exemplary of suitable volatile aromatic materials, benzene, toluene, and xylene can be named; of the ketones, dimethyl ketone and methylisobutyl ketone are representative solvents, Ethyl acetate, butyl acetate, and "Cellosolve" acetate (ethylene glycol monoethyl ether acetate, $CH_3COOCH_2CH_2OC_2H_5$) can be mentioned as examples of esters suitable for compounding the polystyrene cements described herein. Of the possible solvents, xylene has proved of particular usefulness.

Because of the large number of solvents for polystyrene, the number of diluent materials in which polystyrene is insoluble or only slightly soluble is limited. As a diluent, cyclohexane is compatible to a large degree with many true solvents for polystyrene and can be successfully used. Methyl cyclohexane and methyl Cellosolve (ethylene glycol monomethyl ether, $$CH_3OCH_2CH_2OH)$$

are of more limited compatibility, but may be used providing that the proportion of diluent to the solvent used is not so high as to cause precipitation of the dissolved polystyrene.

For the plasticizer, includible of a more flexible cementing film of polystyrene is wanted, dibutylsebacate, dibutylphthalate, and terphenyl partially hydrogenated to 40 to 50 percent saturation are exemplary of suitable compounds. Other plasticizers suitable for use in polystyrene are known in the art. The partially hydrogenated terphenyl mentioned is particularly good as a plasticizing agent for polystyrene films if the plasticizer is not to affect dielectric properties of the polystyrene detrimentally.

The accompanying drawing is a modified ternary diagram showing the composition of particularly good cements for polystyrene.

In the single figure, the coordinates of the diagram are the percents by weight of polystyrene, cyclohexane, and xylene in the cements of interest. The compositions found particularly good have compositions corresponding with those points falling within the area bounded by the pentagon ABCDE, where the apices of the pentagon correspond to the following percentage compositions:

A—3 percent polystyrene, 2 percent xylene, 95 percent cyclohexane
B—3 percent polystyrene, 25 percent xylene, 72 percent cyclohexane
C—10 percent polystyrene, 25 percent xylene, 65 percent cyclohexane
D—15 percent polystyrene, 20 percent xylene, 65 percent cyclohexane
E—15 percent polystyrene, 2 percent xylene, 83 percent cyclohexane Within the above-defined range of compositions, preferred compositions correspond to points within the rectangular area FGHI of the figure. Points FGHI correspond with the following percentage compositions:

F—5 percent polystyrene, 5 percent xylene, 90 percent cyclohexane
G—5 percent polystyrene, 20 percent xylene, 75 percent cyclohexane
H—11 percent polystyrene, 20 percent xylene, 69 percent cyclohexane
I—11 percent polystyrene, 5 percent xylene, 84 percent cyclohexane The best cements containing xylene and cyclohexane as solvent and diluent respectively have compositions corresponding to points falling within the rectangular area JKLM of the accompanying drawing, where points J, K, L, and M, defining the rectangle, correspond with the following percentage compositions:

J—5 percent polystyrene, 12 percent xylene, 83 percent cyclohexane
K—5 percent polystyrene, 16 percent xylene, 79 percent cyclohexane
L—8 percent polystyrene, 16 percent xylene, 76 percent cyclohexane
M—8 percent polystyrene, 12 percent xylene, 80 percent cyclohexane The compositions described above, falling within the area ABCDE or more limited portions thereof, have been described without reference to optional amounts of plasticizer which may be added. Such plasticizers, of which partially hydrogenated terphenyl is a preferred example, may be added in an amount up to 25 percent of the weight of the polystyrene contained in the composition; a minimum of 5 percent of plasticizer is usually added. The addition of a plasticizer in amounts between 15 percent and 25 percent of the weight of polystyrene in the composition gives a cement of particularly good properties.

The polystyrene solids used in preparing the cements may vary widely in their nature. Generally solids having an average molecular weight between 100,000 and 200,000 are most readily available commercially. If there is concern for the dielectric properties of the cementing films, a polystyrene composition free of lubricants or other additives, such as the composition Koppers "'Dylene' Polystyrene 8 Beads," for example, is preferred. Otherwise other grades and qualities are suitable for use.

Application of the cement to the polystyrene parts parts to be joined may be done by any one of a number of conventional methods, such as roller coating, padding on, spraying, or immersion. Enough cement should be applied to one or both surfaces to wet both surfaces to be joined, but puddling or the accumulation of large excesses of cement is to be avoided. Too great a quantity of cement applied locally over a small area may concentrate too much of the true solvent in the area, with resultant surface attack.

The following example is presented to illustrate the operation of the invention described herein, and is not intended to be limiting.

*Example 1*

A solution containing 6.2 parts by weight of polystyrene solids having an average molecular weight between 100,000 and 200,000 in 14.0 parts by weight of xylene was made by adding the solids to the xylene and agitating the mixture. Partially hydrogenated terphenyl (40–50 percent saturated) was added to the extent of 21 percent by weight of polystyrene (1.3 parts by weight of the whole compositions). Then 78.5 parts by weight of cyclohexane were mixed thoroughly with the first solution to give a clear homogeneous fluid.

The edge of a polystyrene sheet 0.005 inch in thickness was dipped into the solution, and then placed edgewise on the face of another such thin polystyrene sheet. Contact was maintained under slight pressure, at room temperature, till the cement had hardened into a firm bond between the two sheets.

Although specific embodiments have been shown and described herein, they are intended to be illustrative only, and not limiting on the scope and spirit of the invention.

What is claimed is:

1. A method for bonding polystyrene surfaces comprising wetting the said surfaces with a fluid adhesive composition which comprises a solvent for polystyrene solids, polystyrene solids dissolved therein, and a diluent which is a member of a class consisting of cyclohexane and methylcyclohexane and ethylene glycol monomethyl ether and placing the wetted surfaces into contact to thereby effect bonding of said surfaces.

2. A method in accordance with claim 1 wherein the solvent is xylene and the diluent is cyclohexane.

3. A method in accordance with claim 1 wherein the fluid adhesive composition comprises a composition defined by points falling within an area on a ternary diagram having as its coordinates percent by weight polystyrene solids, percent by weight xylene, and percent by weight cyclohexane, said area being defined by a pentagon having as its apices the five points defined by:

(1) 3 percent polystyrene solids, 2 percent xylene, and 95 percent cyclohexane
(2) 3 percent polystyrene solids, 25 percent xylene, and 72 percent cyclohexane
(3) 10 percent polystyrene solids, 25 percent xylene, and 65 percent cyclohexane
(4) 15 percent polystyrene solids, 20 percent xylene, and 65 percent cyclohexane (5) 15 percent polystyrene solids, 2 percent xylene, and 83 percent cyclohexane.

4. A method in accordance with claim 1 wherein the fluid adhesive composition comprises a composition defined by points falling within an area on a ternary diagram having as its coordinates percent by weight polystyrene solids, percent by weight xylene, and percent by weight cyclohexane, said area being defined by a quadrilateral having as its apices the four points defined by:

(1) 5 percent polystyrene solids, 5 percent xylene, and 90 percent cyclohexane (2) 5 percent polystyrene solids, 20 percent xylene, and 75 percent cyclohexane (3) 11 percent polystyrene solids, 20 percent xylene, and 69 percent cyclohexane (4) 11 percent polystyrene solids, 5 percent xylene, and 84 percent cyclohexane.

5. A method in accordance wtih claim 1 wherein the fluid adhesive composition comprises a composition defined by points falling within an area on a ternary diagram having as its coordinates percent by weight polystyrene solids, percent by weight xylene, and percent by weight cyclohexane, said area being defined by a quadrilateral having as its apices the four points defined by:

(1) 5 percent polystyrene solids, 12 percent xylene, and 83 percent cyclohexane (2) 5 percent polystyrene solids, 16 percent xylene, and 79 percent cyclohexane (3) 8 percent polystyrene solids, 16 percent xylene, and 76 percent cyclohexane (4) 8 percent polystyrene solids, 12 percent xylene, and 80 percent cyclohexane.

6. A method in accordance with claim 1 wherein the fluid adhesive composition has a plasticizing agent for polystyrene dissolved therein.

7. A method in accordance with claim 6 wherein the plasticizing agent for the polystyrene is hydrogenated terphenyl.

8. A method in accordance with claim 7 wherein the plasticizing agent is included in amounts up to 25 percent by weight of the polystyrene in said composition.

9. A method in accordance with claim 8 wherein the fluid adhesive composition consists essentially of 6.2 parts by weight of polystyrene solids, 14.0 parts by weight of xylene, 78.5 parts by weight of cyclohexane and partially hydrogenated terphenyl in an amount equal to 21 percent by weight of the polystyrene in said composition.

References Cited in the file of this patent

UNITED STATES PATENTS

| | | |
|---|---|---|
| 2,285,562 | Britton et al. | June 9, 1942 |
| 2,348,447 | Bock | May 9, 1944 |
| 2,391,092 | Horback | Dec. 18, 1945 |
| 2,442,810 | Hass | June 8, 1948 |
| 2,454,851 | Warner et al. | Nov. 30, 1948 |